Dec. 14, 1965     M. ROSSNAN     3,222,814

FISHING TACKLES

Filed Feb. 3, 1965

*Michael Rossnan*
INVENTOR

3,222,814
FISHING TACKLES
Michael Rossman, 11724 Lovejoy St., Silver Spring, Md.
Filed Feb. 3, 1965, Ser. No. 430,091
2 Claims. (Cl. 43—36)

My present invention relates to improvements in fishing tackles, and more particularly to fishing hooks, one object of the invention being the provision of a dual hook, the parts of which are spring separated, and held against spring action by the bait, whereby when the fish strikes the bait, the hooks will move outwardly and thus place the barb ends of the hooks within the mouth of the fish, where one or the other or both will hook the fish.

In order that the invention may be fully understood, attention is invited to the accompanying drawings, in which.

Figure 1:
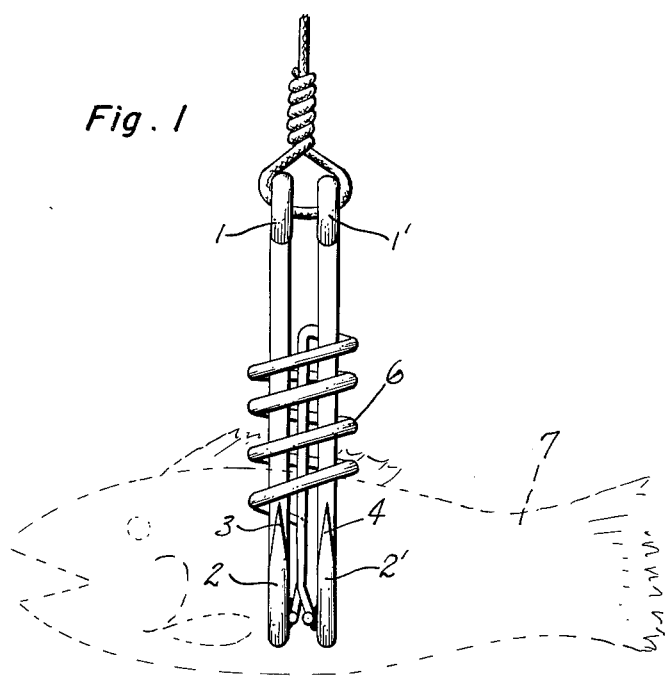
FIGURE 1 is a side view of the dual hook arrangement, showing in dotted line the bait holding the spring under tension and the shanks of the hooks closed together.
Figure 2:
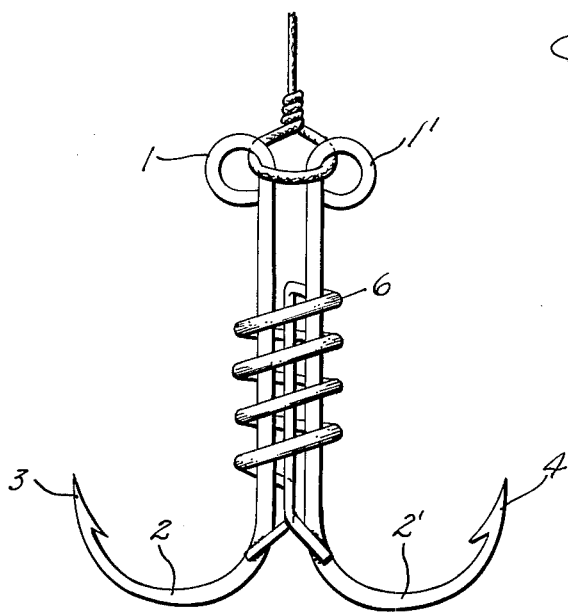
FIGURE 2 is a similar view of the hooks in the extremes position when spring action has moved them outwardly.

FIGURES 1 and 2 of the drawing illustrate one embodiment of the invention in which a pair of fishhooks 2, 2' having the usual shank portions, barbed ends 3, 4, respectively, and line receiving eyes 1, 1', respectively, are placed in spaced side-by-side relation. An expansion coil spring 6 encircles the shank portions and has one free end attached to fishhook 2 and its other free end attached to fishhook 2'. A fishing line is provided with an end portion looped through the eyes 1, 1'. The spring 6 normally biases the barbed ends 3, 4 of the fishhooks outwardly in opposite directions about a vertical axis as shown in FIGURE 2. When the fishing tackle is to be used, the barbed ends 3, 4 are pivoted inwardly against the bias of spring 6 until they occupy a position in spaced substantially parallel planes and a bait 7 is then mounted on the fishhooks to hold the fishhooks under spring tension as illustrated in FIGURE 1. When a fish strikes and takes bait 7 in its mouth, the bait is pulled to release the spring-tensioned fishhooks so that their barbed ends 3, 4 are forced outwardly to impale the walls of the mouth of the fish.

Figure 3:
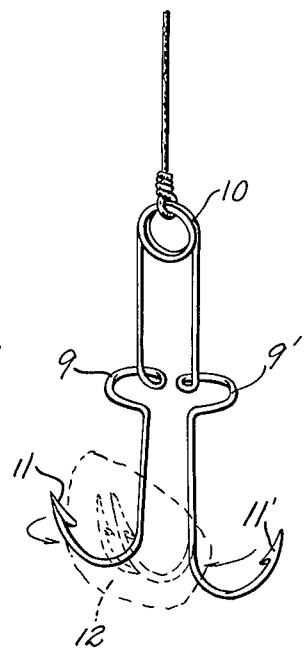
FIGURE 3 is a view similar to FIGURE 1, showing a modified form of the invention.

In the modified form of the invention shown in FIGURE 3 of the drawings, a pair of fishhooks 10 are formed from a single strand of wire bent in a vertical plane at its central portion to form a spring loop adapted to receive a fishing line. The free end portions of the spring loop extend downwardly in substantially parallel relation and are bent outwardly in opposite directions at their terminal portions to form hooked ends 11, 11'. Each free end portion is bent intermediate the spring loop and its hooked end to form a horizontally disposed spring loop 9 or 9'. The central spring loop and the intermediate spring loops 9, 9' normally bias the fishhooks to the position shown in full lines in FIGURE 3. When the fishing apparatus is to be used, the hooked ends 11, 11' are pivoted inwardly against the bias of the spring loops to occupy a position in spaced, substantially parallel planes as shown in dotted lines in FIGURE 3, and bait 12 is secured to the hooked ends to hold the fishhooks under spring tension. As in the embodiment described above, when a fish takes the bait the fishhooks will be released from their spring-tensioned position and the hooked ends 11, 11' will pivot outwardly about the horizontal axis of the central spring loop and also about the vertical axis of each intermediate spring loop 9, 9' to impale the mouth of the fish.

From the foregoing description taken in connection with the drawings, it will be evident that I have produced a dual hook design that requires the bait to hold the hooked ends from separating, but which ends when the bait is taken by the fish will release the hooks or hook, to separate and place the barbed ends in a position within the fish's mouth to insure a catch.

What is claimed is:

1. Fishing tackle comprising a pair of fishhooks, each fishhook having a shank, an eye and a barbed bight portion, a coiled spring encircling said shank portions and having one of its free ends attached to one of said shank portions and its other free end attached to the other of said shank portions for holding said shank portions in a spaced parallel relation and for rotatably biasing said barbed bight portions about a vertical axis in opposite directions, said barbed bight portions being rotatable about said vertical axis against the bias of said spring to a set position in which said bight portions are disposed in the same direction in spaced parallel planes, said bight portions being adapted to be releasably held in said set position by a bait secured thereto.

2. Fishing tackle comprising a single strand of wire having its central portion looped in a vertical plane to form a central coiled spring and with its free end portions extending away from said central spring in the same direction in spaced, parallel relation to provide a pair of spring biased shanks, the terminal portions of said shanks being formed to provide a pair of oppositely directed barbed bight portions, a portion of said shanks intermediate said central spring and said barbed bight portions being looped in a horizontal plane to form intermediate coiled springs, said barbed bight portions being rotatable about the vertical axes of said intermediate springs against the bias thereof from their oppositely directed positions to a set position in which they are disposed in the same direction in spaced parallel planes, said bight portions being adapted to be releasably held in said set position by a bait secured thereto.

References Cited by the Examiner
UNITED STATES PATENTS

| | | | |
|---|---|---|---|
| 2,257,403 | 9/1941 | Vandine | 43—44.6 |
| 2,284,034 | 5/1942 | Binkowski | 43—36 |
| 2,513,548 | 7/1950 | Buss | 43—44.8 |

FOREIGN PATENTS

| | | |
|---|---|---|
| 940,551 | 10/1963 | Great Britain. |

SAMUEL KOREN, *Primary Examiner.*

WARNER H. CAMP, *Assistant Examiner.*